March 22, 1938.   S. F. ARBUCKLE   2,111,580
HEADLIGHT TESTING DEVICE
Filed Sept. 17, 1931   2 Sheets-Sheet 1
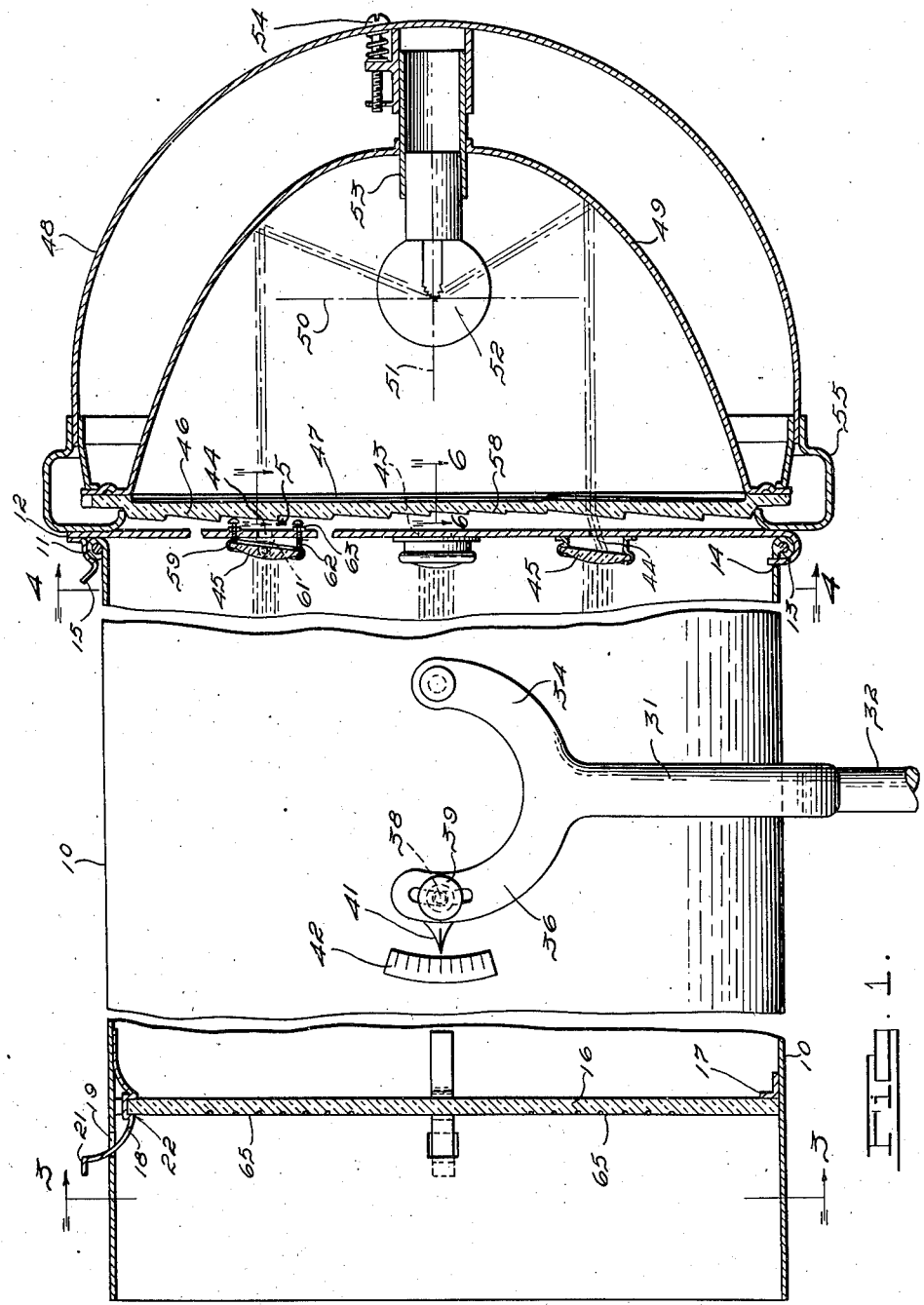
INVENTOR
*Samuel F. Arbuckle.*
BY
*Harness, Dickey, Pierce & Hann.*
ATTORNEYS.

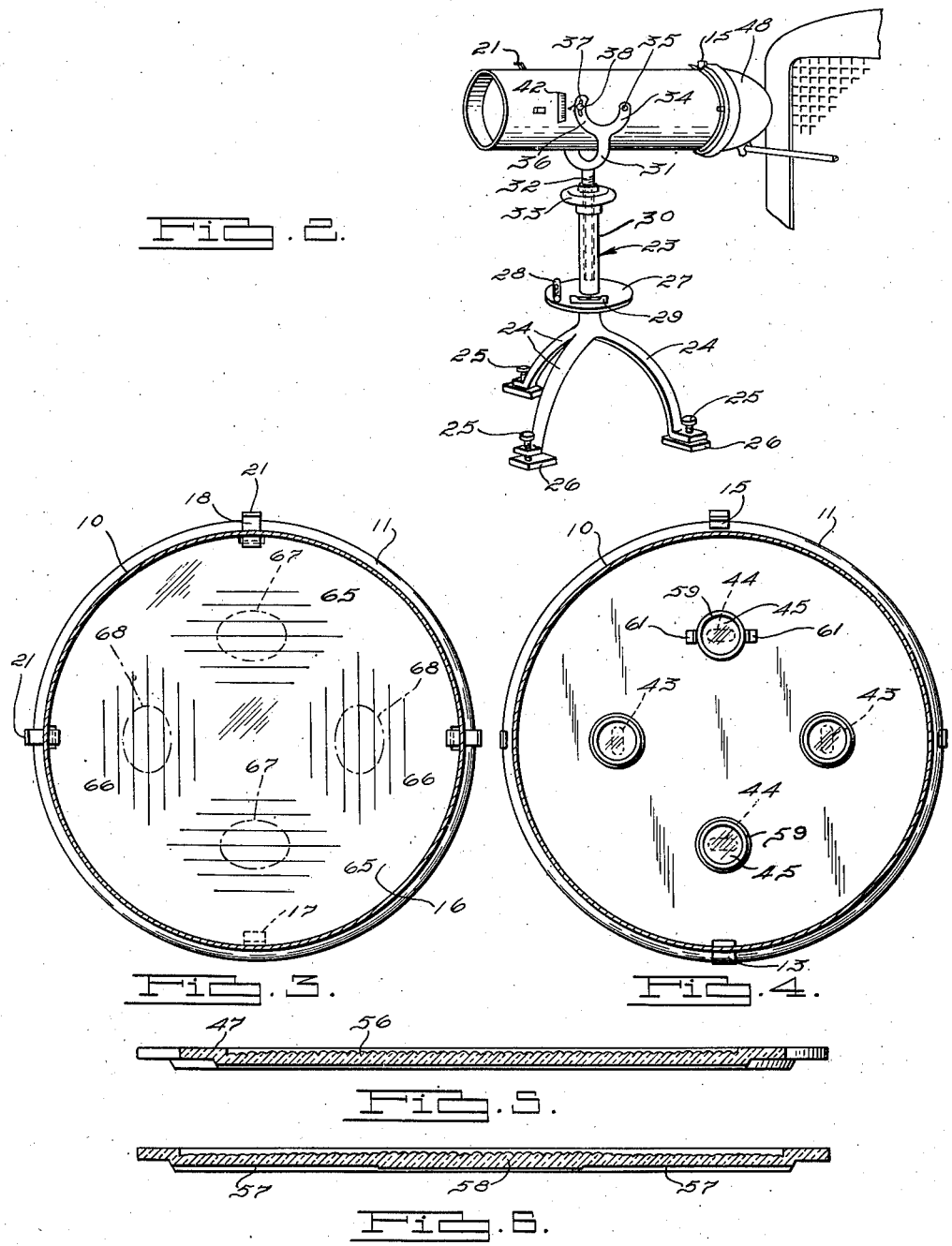

Patented Mar. 22, 1938

2,111,580

UNITED STATES PATENT OFFICE 2,111,580

HEADLIGHT TESTING DEVICE

Samuel F. Arbuckle, Highland Park, Mich., assignor, by mesne assignments, to Guide Lamp Corporation, Anderson, Ind., a corporation of Delaware Application September 17, 1931, Serial No. 563,263

6 Claims. (Cl. 88—14)

This invention relates to a testing device for a head light of a motor or other vehicle and particularly to a self-supporting device by which the correct focus and tilting of the head light may accurately be obtained without any guess work on the part of the operator.

The present invention is an improvement of my testing device illustrated and described in my prior Patent No. 2,003,797, granted June 4, 1935, and has for its main objects; the provision of a testing and focusing device for a head light having a plurality of lenses for directing and concentrating the beams of light projected therethrough; the provision of a tripod for supporting the focusing and testing device having leveling means by which the device is oriented; the provision of indexing means on the device for permitting its angular adjustment relative to the tripod for regulating the degree of tilt of the head light; the provision of a screen in the path of the beams of light projected through the concentrating lenses to accurately indicate when the correct adjustment is obtained, and to provide a device which occurately designates the adjusted position of the lamp, reflector and lens, which is independently supported and adjustable to positions to test any type of head lamp and which, owing to the concentration of the light beams on the screen, may be as readily employed in a bright sunlight as in the dark.

Other objects and features of novelty of my invention will be either specifically pointed out or will become apparent, when referring, for a better understanding of my invention, to the following description in conjunction with the accompanying drawings, wherein:

Figure 1 is a broken view, partly in section and partly in elevation, of a head light testing device embodying features of my invention, Fig. 2 is a reduced perspective view of the device illustrated in Fig. 1 and of the supporting means therefor, in a position to check the adjustment of a headlight of an automotive vehicle, Fig. 3 is a reduced sectional view of the structure illustrated in Fig. 1 taken on the line 3—3 thereof, Fig. 4 is a reduced sectional view of the structure illustrated in Fig. 1 taken on the line 4—4 thereof, Fig. 5 is a sectional view of the headlight lens illustrated in Fig. 1 taken on the line 5—5 thereof, and Fig. 6 is a sectional view of the lens illustrated in Fig. 1, taken on the line 6—6 thereof.

The present invention is an improvement of the device illustrated and described in my above mentioned prior patent, being in the nature of refinements thereto which simplify the aiming and focusing of the headlight. Referring to the drawings, the device is shown as comprising a main cylindrical body portion 10 which is herein illustrated as being made of sheet metal, with the rear end portion thereof provided with an outwardly beaded edge 11 for receiving and supporting a removable plate 12. The plate 12 is provided with a hook-like member 13 at its lower end which encompasses the beading and extends through an aperture 14 provided in the wall of the body portion 10 for locating the plate relative thereto. Resilient fingers 15 are provided on the sides and top of the plate, as illustrated in Fig. 4, for positioning the plate relative to the body portion and for extending over the beaded edge 11 for securing the plate 12 to the body portion in such manner as to have the plate readily removable therefrom.

Extending inwardly within the front end of the body portion 10, I have provided a screen 16 made of frosted glass or other suitable transparent or translucent material which abuts, at its bottom portion, against an angle member 17 which is welded or otherwise secured to the inner surface of the body portion 10. A plurality of spring clamps 18 are supported on the inner surface of the body portion 10, the opposite ends from those supported, extending through apertures 19 in the body portion to provide projecting ends 21 by which detents 22, in the central portions of the spring members 18, may be moved outwardly against the inner surface of the body portion 10, to release the screen 16 and permit its removal from the device.

Referring more particularly to Figs. 1 and 2, a tripod 23 is illustrated as being provided with three legs 24 having adjusting screws 25 in the feet thereof that rest upon blocks 26 which may be disposed on a floor for preventing the screws 25 from sinking into the concrete, wood or other material from which the floor is constructed. A leveling plate 27 is provided above the legs 24 having leveling bubbles 28 and 29 disposed thereon at right angles to each other for the purpose of indicating the horizontal position of the plate 27. When the plate 27 is in horizontal position a tubular extending member 30 is in exact vertical position and supports a forked member 31 which is provided with a threaded stem 32 which snugly fits within the tubular member. The forked member 31 is adjusted relative to the member 30 by a hand wheel 33, the interiorly threaded portion of which engages the thread on the stem 32 of the member 31.

The upper ends of the forked portion of the member 31 are bifurcated to provide extensions 34 which are pivoted to the body portion 10 by pins 35. The adjacent extensions 36 of the bifurcated ends are slotted at 37 to receive studs 38 upon the end of which thumb nuts 39 are provided for clamping the body portion 10 in predetermined relation to the ends of the extensions 36. A pointer 41 extends from one of the extensions 36 adjacent to scale 42 having indicia thereon for determining the tilt of the body portion 10 for effecting a resulting tilt of the head light relative to the ground.

Referring to Figs. 1 and 4, the plate 12 is illustrated as being provided with two horizontally spaced vertically extending slots 43 and two vertically spaced horizontally extending slots 44 which are positioned in predetermined relation to each other with respect to the particular headlight lens which is to be tested. The inner surface of the plate is provided with a plurality of lenses 45 which may be disposed in fixed relation relative to the plate or which may be tiltable relative thereto as illustrated in the top broken portion of Fig. 1.

The offset angularly disposed surfaces 46 of the lens 47 of the head light 48 are provided for refracting the rays of light, which are projected perpendicularly through the lens 47, downwardly toward the road. The disposition of the lenses 45 in relation to the angularly disposed surfaces 46, refracts the light rays upwardly into parallel relation to the rays as they were originally reflected from the surface of the reflector 49 of the headlight and corrects for the sloping surfaces of the headlight lens.

The reflector 49 is of parabolic shape for reflecting the rays of light from the source, outwardly therefrom in parallel relation to each other. This reflection is effected when the light source is in the focal plane 50 of the parabola in aligned relation to the central axis 51 thereof, as illustrated in Fig. 1. All of the rays of light emanating from the focal point of the parabola, which is the point of intersection of the central axis and the focal plane, are reflected in parallel relation outwardly of the reflector as is well known to anyone familiar with parabola constructions. When the body portion 10 of my device is horizontal, the pattern on the screen 16 indicates the position of the filament of the bulb 52 relative to the focal plane 50 and also to the central axis 51. No means is disclosed in the drawing for positioning the filament relative to the central axis and it is necessary, in this type of structure, to change the bulb 52 to one in which the filament is centrally disposed as has been pointed out in my above mentioned prior patent.

The front surfaces of the lenses 45 are of convex form, to have the rays, passing therethrough, converged so as to be concentrated on the screen 16 for providing a small, sharply defined pattern which readily discloses the position of the source of light relative to the focal plane 50 and the central axis 51 of the reflector. The source of light is herein illustrated as being the filament of an incandescent bulb 52 supported in a socket 53 which is adjustable relative to the focal plane 50 of the reflector 49, by the adjusting screw 54. The head light is provided with a suitable lens retaining member 55 which is of conventional form.

Referring to Figs. 5 and 6 it will be noted that the rear surface of the lens 47 is provided with a plurality of vertically extending surfaces 56 for the purpose of diffusing the light rays laterally to spread the beam which projects therethrough in a band across the road to be illuminated. The rays of light spread laterally in this manner will be drawn inwardly, into substantially parallel relation, upon their passage through the lenses 45 to thereby produce concentrated bright spots on the screen. Plane surfaces are provided on the side portions of the lens 47, as illustrated at 57 in Fig. 6, from which the sloping surfaces 46 are omitted and, for this reason, the lenses 45 positioned over the slots 43 are of the type which will concentrate but not deflect a beam as illustrated in Fig. 1. The central part of the lens 47 between the surfaces 57 is provided with sloping surfaces 58 as illustrated in Figs. 1 and 6. It is to be understood that when the plane surfaces 57 are omitted, the central horizontally spaced lenses 45 may be the same as the vertically disposed lenses 45.

I have illustrated, in the upper broken portion of the plate 12, a lens 45 as being provided with an annular ring 59 which is pivoted on the trunnion engaging members 61 positioned on each side of the slot 44. Suitable adjusting means may be provided for regulating the angular position of the lens 45, herein shown as a pair of screws 62 having clamping nuts 63 thereon by which the lens 45 is tilted and clamped in a predetermined position. It is to be understood however that a plate 12 is preferably provided for each individual type of lens 47 with the slots 43 and 44 disposed therein in predetermined relative position to each other and the headlight lens with the lenses 45 mounted therein, conforming to the contour of the front and rear surface of the headlight lens.

Referring to Figs. 1 and 3 I have illustrated the screen 16 as being provided with a plurality of sets of horizontal and vertical lines 65 and 66 respectively upon which the light, passing through the slots 43 and 44 and the lenses 45, impinges for the purpose of designating to an operator the focus of the light source relative to the reflector 49 and the tilt of the head light relative to the road. I have illustrated light patterns 67 disposed on the centermost of the plurality of lines 65 and patterns 68 disposed centrally of the lines 66. When the patterns are disposed in this manner, after the proper set-up of the device is made, assurance may be had that the headlight is properly focused and properly aimed.

It is very evident that if the relation of the slots 43 and 44 varies in the various plates 12 provided with my device, the positions of the lines 65 and 66 of the screen 16 will likewise change their relation, so that when a plurality of the plates 12 are provided for various lenses 47 a similar number of screens 16 properly identified therewith must also be provided.

The operation of my device will now be described. Referring to Fig. 1, the tripod 23 is moved to a position on the level part of a floor upon which a car having headlights to be adjusted has been positioned. The device is then adjusted to have the body portion 10 positioned in the extension of the headlight 48 with the indicator 41 set opposite to the indicia of the scale 42 which effects the proper angle to the head light. The indexing is so provided as to readily apprise an operator of the precentage of tilt to be effected in 100 feet. Since the requirement as to the tilting of the headlight varies in various localities, the adjustable tilting feature of the device is necessary in order to meet all requirements. When the proper tilt for 100 feet has been set on the index, the thumb nut 39 is then clamped to retain the body portion 10 in predetermined relation to the tripod. The hand screw 33 is then turned to approximately position the body portion in height relative to the headlight 48 and the device is moved to have the plate 12 in contiguous relation to the rim 55 of the head light after which the adjusting screws 25 may be utilized for accurately leveling the plate 27 by means of the leveling bubbles 28 and 29. When accurately leveled the hand screw 33 may then be further adjusted to position the device in exact alignment with the head light as illustrated in Figs. 1 and 2. The filament of the bulb 52 is then energized and the patterns on the screen 16 are examined.

If the patterns 68 fail to fall on the centermost of the lines 66 the adjusting screw 54 is then regulated for moving the filament of the bulb 52 into exact coincidence with the focal plane of the reflector 49 which is made apparent to the operator by the coincidence of the center of the patterns 68 with the centermost of the lines 66 as illustrated in Fig. 3. After the headlight has, in this manner, been focused the patterns 67 are examined and if they fail to be bisected by the centermost of the lines 65 the headlight is tilted upwardly or downwardly until the patterns exactly coincide with the center lines as illustrated in Fig. 3. When the patterns have been in this manner adjusted to be intersected by the centermost of the lines 65 and 66 the filament is on the central axis in the focal plane of the reflector and the headlight is properly focused and adjusted.

It will thus be seen that my adjusting and aiming device is an entire individual piece of apparatus which is self supporting and which is readily positioned adjacent to any headlamp to be tested irrespective of its diameter. By providing a lens over each of the apertures, through which the light penetrates to within the body portion of the device, the beams thus effected are concentrated to provide an extremely bright pattern of small sharp outline which is readily visible even in a strong sunlight.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. A device for testing the focus and direction of a headlight including, in combination, a plate having apertures through which light projects, a screen upon which said light impinges and a lens positioned adjacent to each of said apertures in angular relation to said plate in conformity to the slope of the surface of the lens of the headlight.

2. A device for testing the focus and direction of a headlight including, in combination, a plate having apertures through which light from the headlight projects, a screen upon which said light impinges, and a plurality of lenses positioned adjacent to said apertures, some of which are angularly disposed with reference to the plate to conform to the slope of the surface of the lens of the headlight.

3. A device for testing the focus and direction of a headlight including, in combination, a plate having apertures through which light from the headlight projects, a screen upon which said light impinges, a plurality of lenses positioned adjacent to said apertures, pivotal means for supporting said lenses, and adjustable means for tilting said lenses relative to the plate.

4. A device for testing the direction and parallelism of an automobile headlight or the like, having a prismatic lens, comprising, in combination, an opaque plate having one or more apertures positioned to pass selected portions of a beam of light from an automobile headlight, a screen in fixed relation with said opaque plate, indicia on said screen positioned to indicate the impinging positions and sizes of said selected portions of said beam, said apertures being each provided with a lens positioned to converge the beam portion passing therethrough, means for adjusting the position of each lens to compensate for the prismatic portions of the headlight lens, adjustable means of positioning the device so that its axis makes desired small angles with the horizontal, an indicator showing the magnitude of said angle.

5. In a headlamp tester, the combination of a support, supporting means mounted for pivotal adjustment on the support, a screen carried by the supporting means, an apertured plate carried by said supporting means, a lens mounted over the aperture of the plate for pivotal adjustment with respect to the screen, said lens being arranged to focus light rays on said screen.

6. In the combination as defined in claim 5, the axes of the said pivotal mountings being parallel.

SAMUEL F. ARBUCKLE.